United States Patent
Cherry et al.

(10) Patent No.: US 11,367,173 B2
(45) Date of Patent: Jun. 21, 2022

(54) CAPTURED IMAGE BASED VALIDATION OF PRINTED TOKENS

(71) Applicant: Hewlett-Packard Development Company, L.P., Spring, TX (US)

(72) Inventors: Darrel D. Cherry, Boise, ID (US); Kristofer D. Provencio, Boise, ID (US); Mark Q. Shaw, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/256,726

(22) PCT Filed: Dec. 6, 2018

(86) PCT No.: PCT/US2018/064252
§ 371 (c)(1),
(2) Date: Dec. 29, 2020

(87) PCT Pub. No.: WO2020/117243
PCT Pub. Date: Jun. 11, 2020

(65) Prior Publication Data
US 2021/0358108 A1    Nov. 18, 2021

(51) Int. Cl.
*G06T 7/00* (2017.01)
*G06K 15/00* (2006.01)

(52) U.S. Cl.
CPC .......... *G06T 7/0004* (2013.01); *G06K 15/408* (2013.01); *G06T 2207/30144* (2013.01)

(58) Field of Classification Search
CPC ..... G06T 7/0002; G06T 7/001; G06T 7/0008; G06T 1/0021; G06T 2201/0202; G06K 15/408

USPC ...................................... 358/1.14, 1.18, 504
See application file for complete search history.

(56) References Cited

U.S. PATENT DOCUMENTS

| | | | |
|---|---|---|---|
| 5,564,841 | A | 10/1996 | Austin et al. |
| 6,002,844 | A | 12/1999 | Kishida et al. |
| 6,535,299 | B1 | 3/2003 | Scherz |
| 6,823,075 | B2 | 11/2004 | Perry |
| 7,380,714 | B2 | 6/2008 | Jusas et al. |

(Continued)

FOREIGN PATENT DOCUMENTS

| | | |
|---|---|---|
| EP | 3040903 B1 | 6/2018 |
| JP | 5734021 | 11/2004 |

OTHER PUBLICATIONS

Lee et al , "A Model for Embedding and Authorizing Digita Signatures in Printed Documents", KR Informations Security Agency, Mar. 14, 2003, 14 pgs.

*Primary Examiner* — Jamares Q Washington
(74) *Attorney, Agent, or Firm* — Jefferson IP Law, LLP

(57) ABSTRACT

According to examples, an apparatus may include a processor and a non-transitory computer readable medium that the processor may execute to determine whether a token is to be printed printed onto the medium, following printing onto the medium in a printing system, cause a scan bar in a media feed path of the printing system to capture an image of the printed medium. The processor may also determine, from the captured image of the printed medium, whether the token was properly printed onto the printed medium and, based on a determination that the token was not properly printed onto the printed medium, output an indication and/or an instruction corresponding to the token being improperly printed.

16 Claims, 5 Drawing Sheets

(56) References Cited

U.S. PATENT DOCUMENTS

| | | |
|---|---|---|
| 7,532,738 B2 | 5/2009 | Hashimoto et al. |
| 2005/0114667 A1* | 5/2005 | Haas ................ G06T 1/005 |
| | | 713/176 |
| 2011/0096355 A1* | 4/2011 | Huang ................ G06F 3/122 |
| | | 358/1.15 |
| 2014/0300909 A1 | 10/2014 | Robinson |
| 2016/0267510 A1 | 9/2016 | Freeman et al. |
| 2017/0111523 A1* | 4/2017 | Ackley ............ G06K 19/06037 |

\* cited by examiner

400

```
┌─────────────────────────────────────────────┐
│ CONTROL A PRINT MECHANISM TO PRINT CONTENT AND │
│         A TOKEN ONTO A MEDIUM                │
│                   402                        │
└─────────────────────────────────────────────┘
                      │
                      ▼
┌─────────────────────────────────────────────┐
│ CONTROL A SCAN BAR TO CAPTURE AN IMAGE OF THE │
│  PRINTED CONTENT AND THE PRINTED TOKEN ON THE │
│               PRINTED MEDIUM                 │
│                   404                        │
└─────────────────────────────────────────────┘
                      │
                      ▼
┌─────────────────────────────────────────────┐
│ DETERMINE WHETHER THE PRINTED MEDIUM INCLUDES │
│           A VALID COPY OF THE TOKEN          │
│                   406                        │
└─────────────────────────────────────────────┘
                      │
                      ▼
┌─────────────────────────────────────────────┐
│   OUTPUT AN INDICATION AND/OR AN INSTRUCTION │
│    CORRESPONDING TO THE TOKEN BEING INVALIDLY│
│    PRINTED ONTO THE PRINTED MEDIUM BASED ON A│
│   DETERMINATION THAT THE PRINTED MEDIUM DOES NOT │
│        INCLUDE A VALID COPY OF THE TOKEN     │
│                   408                        │
└─────────────────────────────────────────────┘
```

*FIG. 4*

CAPTURED IMAGE BASED VALIDATION OF PRINTED TOKENS

BACKGROUND

Objects, such as documents and other products, may be printed to include tokens that may identify a feature of the documents and/or may include meta-data. The tokens may be barcodes, quick response (QR) codes, and/or patterns such as watermarks. The tokens may be printed onto the objects for any of a variety of purposes, e.g., security, authentication, and/or identification.

BRIEF DESCRIPTION OF THE DRAWINGS

Features of the present disclosure are illustrated by way of example and not limited in the following figure(s), in which like numerals indicate like elements, in which:

FIGS. 4 and 5, respectively, depict example methods for validating a token printed onto a printed medium based on a captured image of the token.

DETAILED DESCRIPTION

Figure 1:
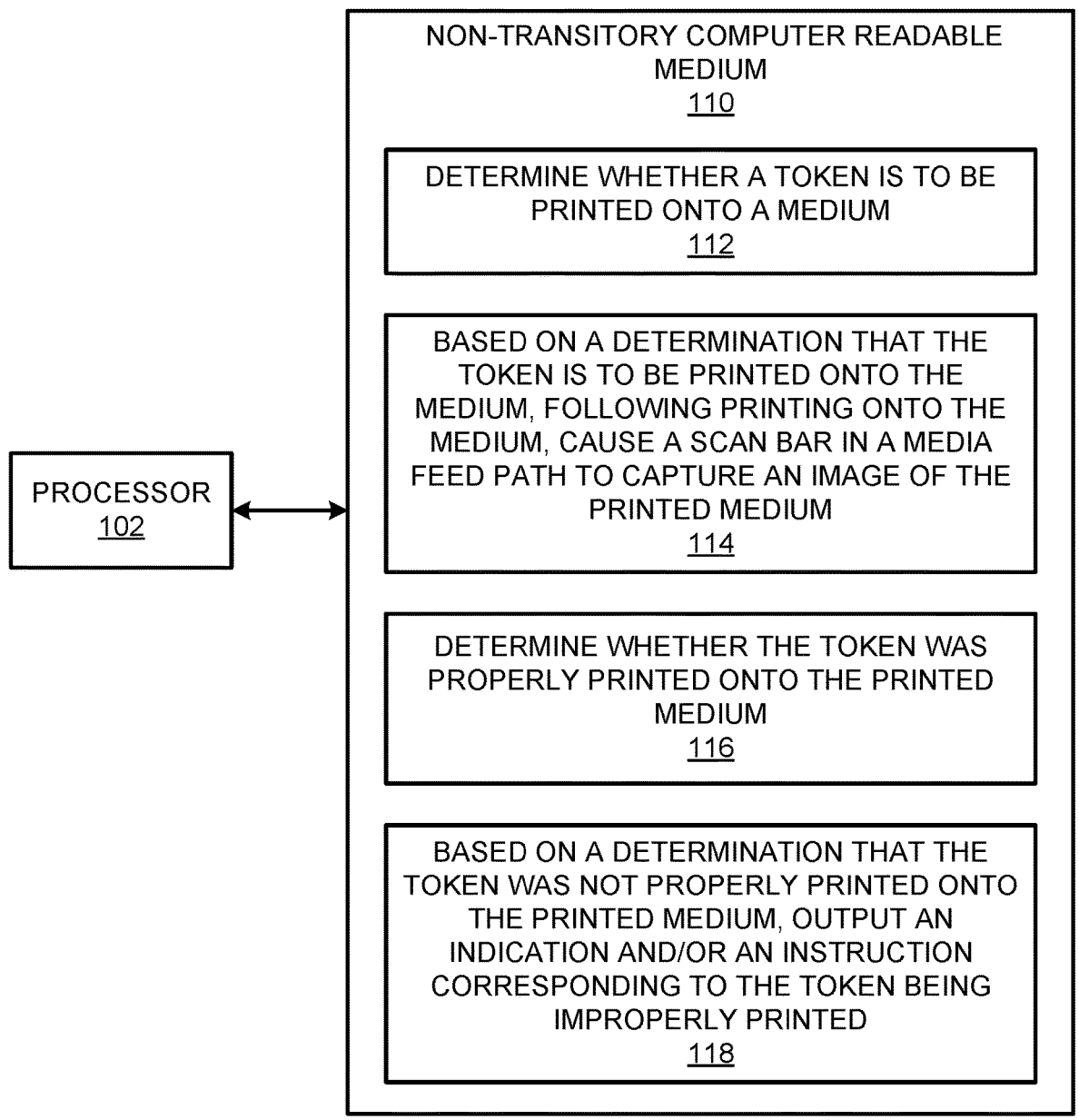
FIG. 1 shows a block diagram of an example apparatus that may determine whether a token was properly printed onto a printed medium.

A printing device may print a token along with content from an image file onto a medium, such as a paper document, a 3D printed object, or the like. In some instances, the printing device may improperly print the token such that the token may have a defect and/or may not be accurately readable. For instance, the token may be printed with an insufficient concentration of marking material to enable the token to be adequately visible. As another example, the token may be printed with a defect, such that the information represented by the token is inaccurate. An improperly printed token may thus prevent the functionality behind the token from being useful.

Disclosed herein are apparatuses, printing systems, and methods that may validate a printed token shortly after the token is printed onto a medium. For instance, the apparatuses disclosed herein may determine whether the token was properly printed during a printing operation of the printed medium with the token using a scan bar positioned along a feed path of the printed medium. That is, after the token is printed onto a medium, a processor of the apparatuses disclosed herein may control a scan bar to capture an image of the printed token. The processor may also determine whether the token was properly printed, e.g., is valid, based on an analysis of the token in the captured image. As discussed herein, the processor may perform the analysis itself or may send a copy of the token image to another computing device, in which the computing device may perform the analysis and inform the processor of the results of the analysis. Based on a determination that the token was not properly printed, the processor may output an indication and/or an instruction corresponding to the token being improperly printed.

The processor may cause the scan bar to selectively capture images of the printed medium such that, for instance, the scan bar may not capture images of printed media that do not include a token. The processor may cause the scan bar to selectively capture images through selective activation of the scan bar and/or through selective control of the media feed paths along with the printed media are fed. The processor may further cause a finishing mechanism to be selectively operated such that, for instance, printed media upon which tokens have been improperly printed may be prevented from undergoing a finishing operation.

Through implementation of the apparatuses, printing systems, and methods disclosed herein, a determination as to whether a token has been properly printed, e.g., is valid, may be made shortly after the token is printed onto a medium. For instance, the determination may be made during a printing operation of the token. As a result, an improperly printed token may be identified and in some instances, corrected, quickly, which may result in a smaller amount of wasted resources, e.g., printing material, media, energy, etc., as additional media with improperly printed tokens may continue to be printed in instances in which the improperly printed token is not quickly identified. In addition, finishing operations on media upon which tokens have been improperly printed may be avoided, which may further reduce wasted resources.

Before continuing, it is noted that as used herein, the terms "includes" and "including" mean, but is not limited to, "includes" or "including" and "includes at least" or "including at least." The term "based on" means "based on" and "based at least in part on."

Figure 2:
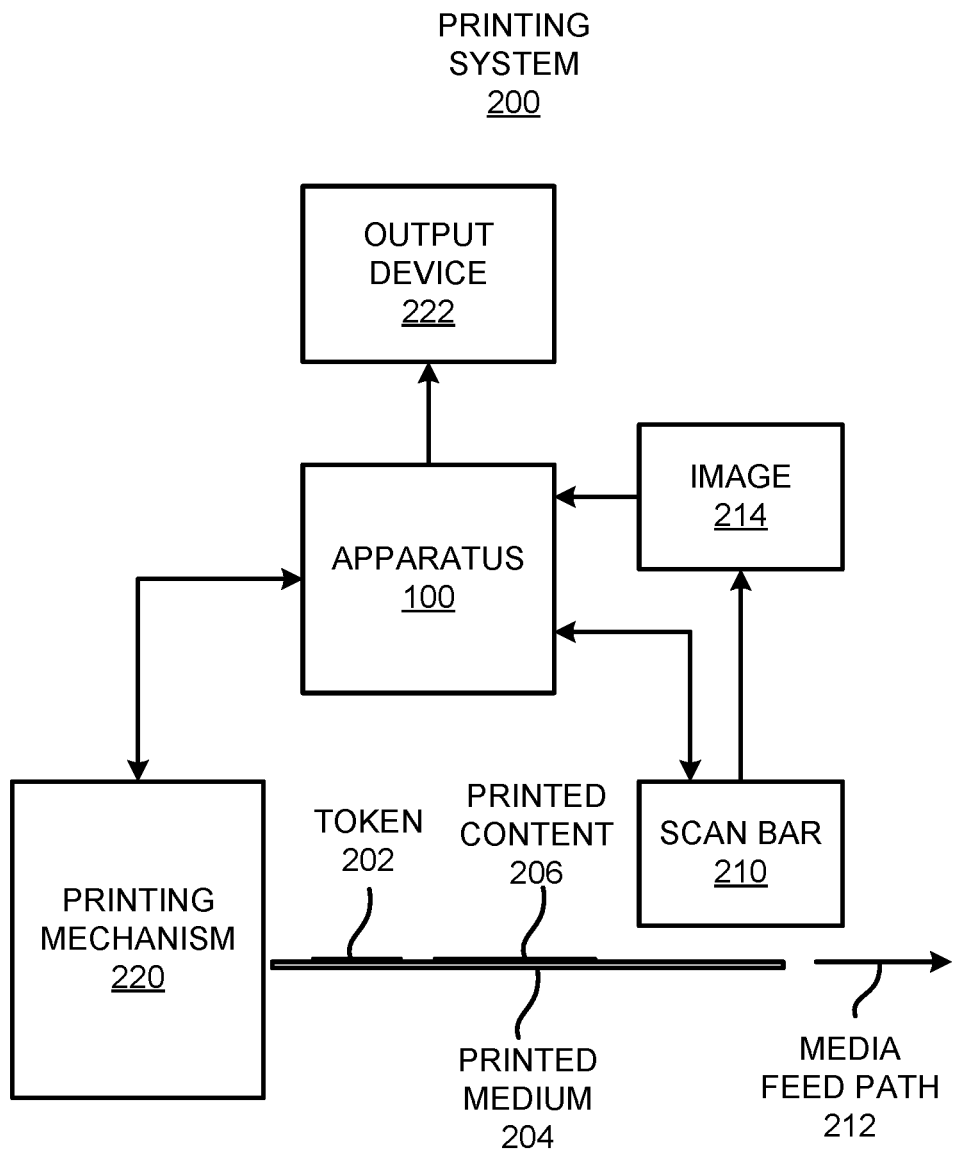
FIG. 2 shows a block diagram of an example printing system that may include the example apparatus depicted in FIG. 1.

Reference is first made to FIGS. 1 and 2. FIG. 1 shows a block diagram of an example apparatus 100 that may determine whether a token was properly printed onto a printed medium. FIG. 2 shows a block diagram of an example printing system 200 that may include the example apparatus 100 depicted in FIG. 1. It should be understood that the apparatus 100 depicted in FIG. 1 and/or the printing system 200 depicted in FIG. 2 may include additional components and that some of the components described herein may be removed and/or modified without departing from the scopes of the apparatus 100 and/or the printing system 200 disclosed herein.

The apparatus 100 may be a computing apparatus, e.g., a personal computer, a laptop computer, a tablet computer, a smartphone, or the like. In these examples, the apparatus 100 may be separate from the printing system 200 and may communicate with components of the printing system 200 over a direct or a network connection (not shown). In other examples, the apparatus 100 may be part of the printing system 200. In these examples, the apparatus 100 may be part of a control system of the printing system 200 and may communicate with components of the printing system 200. In addition, the apparatus 100 may communicate with the printing system 200 components via a communication bus. By way of example, the apparatus 100 may have a processor 102 that may communicate instructions to or otherwise control various components of the printing system 200 to print marking material onto media. The printing system 200 may be a printer, a copier, a facsimile machine, a 3D printing system, or the like, and may include a printing mechanism 220 that may apply printing material onto a medium 206, for instance, into a particular design and/or as text.

As shown in FIG. 1, the apparatus 100 may include a processor 102 that may control operations of the apparatus 100. The processor 102 may be a semiconductor-based microprocessor, a central processing unit (CPU), an application specific integrated circuit (ASIC), a field-programmable gate array (FPGA), a graphics processing unit (GPU), and/or other hardware device. The apparatus 100 may also include a non-transitory computer readable medium 110 that may have stored thereon machine readable instructions 112-118 (which may also be termed computer readable instructions) that the processor 102 may execute. The non-transitory computer readable medium 110 may be an electronic, magnetic, optical, or other physical storage device that contains or stores executable instructions. The non-transitory computer readable medium 110 may be, for example, Random Access memory (RAM), an Electrically Erasable Programmable Read-Only Memory (EEPROM), a storage device, an optical disc, and the like. The term "non-transitory" does not encompass transitory propagating signals.

The processor 102 may fetch, decode, and execute the instructions 112 to determine whether a token 202 is to be printed onto a medium 204. The processor 102 may determine whether the token 202 is to be printed prior to the token 202 being printed onto the medium 204 based upon information contained in a raster image to be printed onto the medium 204. That is, for instance, the processor 102 may access a raster image to be printed onto the medium 204 from a print file that may describe the raster image. The processor 102 may determine whether the token 202 is to be printed onto the medium 204 from the accessed raster image included in the print file. For instance, the processor 102 may determine that the token 202 is to be printed onto the medium 204 based on the accessed raster image including an instruction to print the token 202. However, the processor 102 may determine that the token 202 is not to be printed onto the medium 204 based on the accessed raster image not including an instruction to print the token 202.

In some examples, the printing mechanism 220 may process the raster image in preparation for printing the raster image onto the medium and may determine whether the raster image includes an embedded token 202. Based on a determination that the raster image includes an embedded token 202, the printing mechanism 220 may flag the raster image as an image that includes a token to be validated. The printing mechanism 220 may also send an instruction to the apparatus 100 that the raster image to be printed includes a token 202 to be validated. In these examples, the processor 102 may determine that a token 202 is to be printed onto the medium 204 based on receipt of the instruction from the printing mechanism 220. In some examples, the raster image may not include the token, but instead, the printing mechanism 220 may determine that the token 202 is to be printed and the printing mechanism 220 may include the token onto the printed medium 204. In these examples, the printing mechanism 220 may be set and/or may follow a policy to include the token onto the printed medium 204.

In some examples, the type of the token 202 may also be determined prior to printing the token 202. The type of the token 202 may be, for instance, a QR code, a bar code, a particular pattern to be printed onto the medium 204, and/or the like. The particular pattern may be a pattern that may be printed in a manner such that pattern may not be visible to the naked eye and/or may be printed in a manner that may not disrupt main content printed on the medium 204, e.g., a watermark. By way of example, the token 202 may be information or a pattern that may be printed onto a medium 204 for security purposes.

The processor 102 may fetch, decode, and execute the instructions 114 to, based on a determination that the token 202 is to be printed onto the medium 204, following printing onto the medium 204 in the printing system 200, cause a scan bar 210 in a media feed path 212 of the printing system 200 to capture an image 214 of the printed medium 204. As shown in FIG. 2, the printing system 200 may include a printing mechanism 220 that may print printing material onto the printed medium 204. The printing mechanism 220 may include, for instance, an inkjet printing mechanism, a laser printing mechanism, or the like. In this regard, the printing material, or equivalently, marking agent, may be a printing liquid, such as ink, a laser printing material, such as toner, or the like.

In any regard, the printing mechanism 220 may print the content 206 and/or the token 202 onto the printed medium 204 and the printed medium 204 may be fed along the media feed path 212. The content 206 may include any content other than the token 202 that is printed onto the printed medium 204, such as text, characters, pictures, or the like. In some examples, the printing mechanism 220 may print the content 206 and the token 202 using the same type of printing material, while in other examples, the printing mechanism 220 may print the content 206 and the token 202 using different types of printing material. For instance, the printing mechanism 220 may print the token 202 using a special type of ink that the printing mechanism 220 may not use to print the content 206.

As the printed medium 204 is fed along the media feed path 212, the processor 102 may control the scan bar 210 to capture an image of the token 202 on the printed medium 204. The scan bar 210 may also capture an image of the printed content 206. According to examples, the scan bar 210 may extend the width of the printed medium 204 or a slightly larger width than the printed medium 204. In addition, the scan bar 210 may include an array of camera elements, e.g., charge-coupled devices or other optical elements for capturing images.

In some examples, the printing system 200 may include a single media feed path 212 from the printing mechanism 220 and the scan bar 210 may be positioned along the single media feed path 212. In these examples, the processor 102 may cause the scan bar 210 to be activated to capture an image of the token 202 as the printed medium 204 is fed past the scan bar 210 based on a determination that the token 202 is to be or was printed onto the medium 204. This may involve capturing multiple images of portions of the token 202 as the medium 204 is fed past the scan bar 210 and stitching the multiple images together to form an image of the medium 204. However, based on a determination that the token 202 is not to be printed or was not printed onto the medium 204, the processor 102 may maintain the scan bar 210 in an inactive state as the printed medium 204 is fed in the media feed path 212 past the scan bar 210. That is, the scan bar 210 may not capture an image of the printed medium 204 as the printed medium 204 is fed past the scan bar 210 along the media feed path 212. As such, for instance, the scan bar 210 may not capture images of printed media 204 upon which tokens 202 are not printed.

Figure 3:
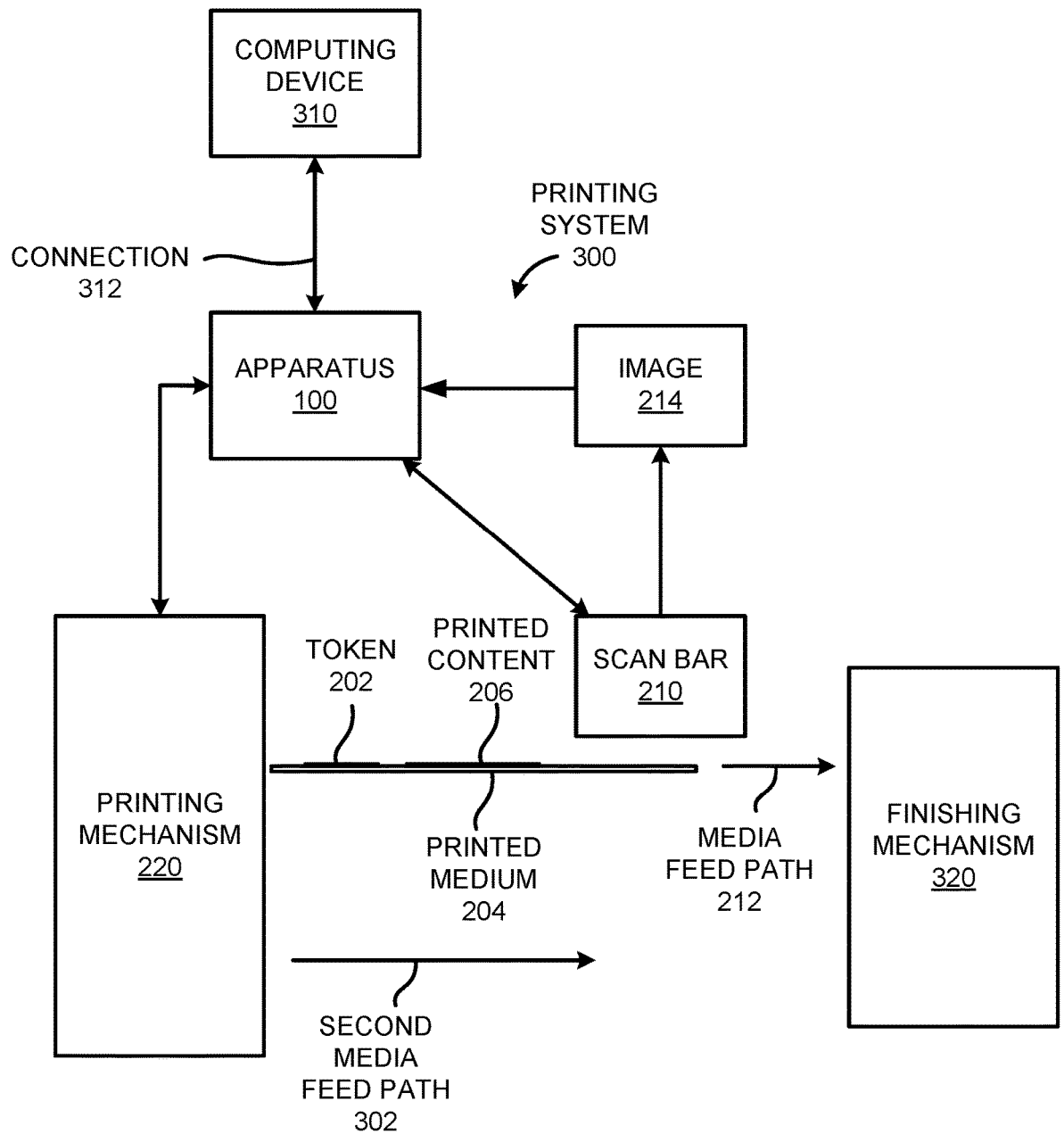
FIG. 3 shows a block diagram of an example printing system that may include the example apparatus depicted in FIG. 1.

In other examples, and as shown in FIG. 3, the printing system 200 may include multiple media feed paths 212, 302 from the printing mechanism 220 and the scan bar 210 may be positioned along one of the media feed paths 212. In these examples, based on a determination that the token 202 is printed or is to be printed onto the medium 204, the printed medium 204 with the printed token 202 may be fed along the media feed path 212 along which the scan bar 210 is positioned. However, based on a determination that the token 202 is not printed or is not to be printed onto the medium 204, the printed medium 204 with the printed token 202 may be fed along a second media feed path 302 along which the scan bar 210 may not be positioned.

The processor 102 may fetch, decode, and execute the instructions 116 to determine, from the captured image 214 of the printed medium 204, whether the token 202 was properly printed onto the printed medium 204. In some examples, the processor 102 may determine whether the token 202 was properly printed onto the printed medium 204 based on the determined type of the token 202. That is, based on a determination that the token 202 is a bar code, the processor 102 may identify a bar code in the captured image 214. As another example, based on a determination that the token 202 is a printed pattern, the processor 102 may search for and identify the printed pattern in the captured image 214.

In some examples, the processor 102 may determine whether the token 202 is readable and may determine that the token 202 was properly printed onto the printed medium 204 based on a determination that the token 202 is readable. In contrast, the processor 102 may determine that the token 202 was not properly printed onto the printed medium 204 based on a determination that the token 202 is not readable. In addition or in other examples, the token 202 may include and/or represent meta-data and the processor 102 may determine whether the meta-data is accurately readable, e.g., whether the processor 102 may determine the contents of the meta-data and whether the determined contents of the meta-data are accurate. For instance, the processor 102 may determine whether meta-data correctly corresponds to the printed content 206. Based on a determination that the meta-data is accurately readable, the processor 202 may determine that the token 202 was properly printed onto the printed medium 204 based on a determination that the meta-data is readable. However, based on a determination that the meta-data is not accurately readable, the processor 202 may determine that the token 202 was not properly printed onto the printed medium 204.

The processor 102 may fetch, decode, and execute the instructions 118 to, based on a determination that the token 202 was not properly printed onto the printed medium 204, output an indication and/or an instruction corresponding to the token 202 being improperly printed. As shown in FIG. 2, the printing system 200 may include an output device 222, which may be a display, a speaker, an input/output interface, or the like, and the processor 102 may output an indication, which may be a visual and/or an audible alert through the output device 222.

In addition, or in other examples, the processor 102 may output an instruction to the printing mechanism 220 to modify a printing operation of a future medium that is to include a token 202. For instance, the processor 102 may output an instruction to the printing mechanism 220 to stop printing of a medium with a token 202. As another example, the processor 102 may output an alert externally of the printing system 200, e.g., to a dealer, a maintenance person, or the like, of the printing system 200. As a further example, the processor 102 may output an instruction to the printing mechanism 220 to modify a setting on the printing mechanism 220 to self-correct the printing of the token 202. By way of example, the processor 102 may output an instruction to the printing mechanism 220 to increase an amount of marking agent used to print the token 202, to decrease a speed at which the medium is fed through the printing mechanism 220, and/or the like.

With reference now to FIG. 3, there is shown a block diagram of an example printing system 300 that may include the example apparatus 100 depicted in FIG. 1. It should be understood that the printing system 300 depicted in FIG. 3 may include additional components and that some of the components described herein may be removed and/or modified without departing from the scope of the printing system 300 disclosed herein.

The printing system 300 may include many of the same components as the printing system 200 depicted in FIG. 2 and thus, descriptions of the common components are not repeated with respect to the printing system 300.

As shown, the printing system 300 may include a second media feed path 302 from the printing mechanism 220. As discussed above, printed media 204 upon which a token 202 has not been printed may be fed along the second media feed path 302 from the printing mechanism 220. As a result, printed media 204 that does not include a token 202 may bypass the scan bar 210. In some examples, the scan bar 210 may be controlled to capture images 214 of each of the printed media that travels past the scan bar 210 such that each of the captured images 214 includes an image of a token 202.

As also shown in FIG. 3, the apparatus 100 may be in communication with a computing device 310 via a connection 312. In some examples, the processor 102 may send a copy of the captured image 214 of the printed medium 204, a copy of the token 202 in the captured image 214, or both, to the computing device 310. The computing device 310 may be a cloud-based server with which the apparatus 100 may communicate over the connection 312, such as a network connection via the Internet. In other examples, the computing device 310 may be a server with which the apparatus 100 may communicate over the connection 312, such as a local area network or the like.

In any of these examples, the computing device 310 may determine whether the token 202 was properly printed onto the printed medium 204 in any of the manners discussed above with respect to the processor 102. That is, the computing device 310 may determine whether the token 202 was properly printed onto the printed medium 204 from the captured image 214 of the printed medium 204, the copy of the token 202, or both based on whether the image of the token 202 is readable and/or whether meta-data of the token 202 is accurately readable. The computing device 310 may also return an indication as to whether the token 202 was properly printed onto the printed medium 204 (e.g., validated) to the apparatus 100 via the connection 312. In addition, the processor 102 may determine whether the token 202 was properly printed onto the printed medium 204 (e.g., validated) based on the indication returned from the computing device 310.

According to examples, the processor 102 may have the option to validate the token 202 itself or to have the computing device 310 validate the token 202. In these examples, the processor 102 may determine whether a validation of the token 202 is to occur at the apparatus 100, e.g., by the processor 102, or at the computing device 310. The processor 102 may perform the validation of the token 202 based on a determination that the validation of the token 202 is to occur at the apparatus 100. In addition, the processor 102 may send a copy of the captured image 214 and/or a copy of the token 202 to the computing device 310 based on a determination that the validation of the token 202 is to occur at the computing device 310.

The processor 102 may determine that the token 202 is to be validated at the apparatus 100 or the computing device 310 based on any of a number of considerations. By way of example, the processor 102 may base the determination on a security consideration. For instance, the processor 102 may be selected to validate the token 202 in an instance in which the token 202 includes private and/or secure information to which the processor 102 may have access. As another example, the computing device 310 may be selected to validate the token 202 in an instance in which the token 202 includes private and/or secure information that the processor 102 may not access, but to which the computing device 310 may have access. As a further example, the processor 102 may be selected to validate the token 202 in an instance in which security protocols prevent the token 202 from be communicated externally to the printing system 300.

In addition or alternatively, the processor 102 may base the determination on a capability consideration of the processor 102 and the computing device. For instance, the processor 102 may validate certain types of tokens 202 while being unable to validate other types of tokens 202. In these examples, the processor 102 may validate the tokens 202 for which the processor 102 is able to validate and may send the tokens 202 that the processor 102 may not be able to validate to the computing device 310.

As also shown in FIG. 3, the printing system 300 may include a finishing mechanism 320 that may be positioned along the media feed path 212 and/or the second media feed path 302. The finishing mechanism 320 may include components to perform a finishing operation on the printed medium 204 or to multiple printed media. The finishing operations may include, for instance, stapling, collating, aligning, and/or the like, of multiple printed media. According to examples, based on a determination that a token 202 was improperly printed onto a printed medium 204, e.g., not validated, the processor 102 may control the finishing mechanism 320 to prevent a finishing operation from being performed on the printed medium 204. The processor 102 may thus prevent the finishing mechanism 320 from performing a finishing operation on a printed medium 204 having an invalid token 202 as that printed medium 204 may be discarded.

Figure 5:
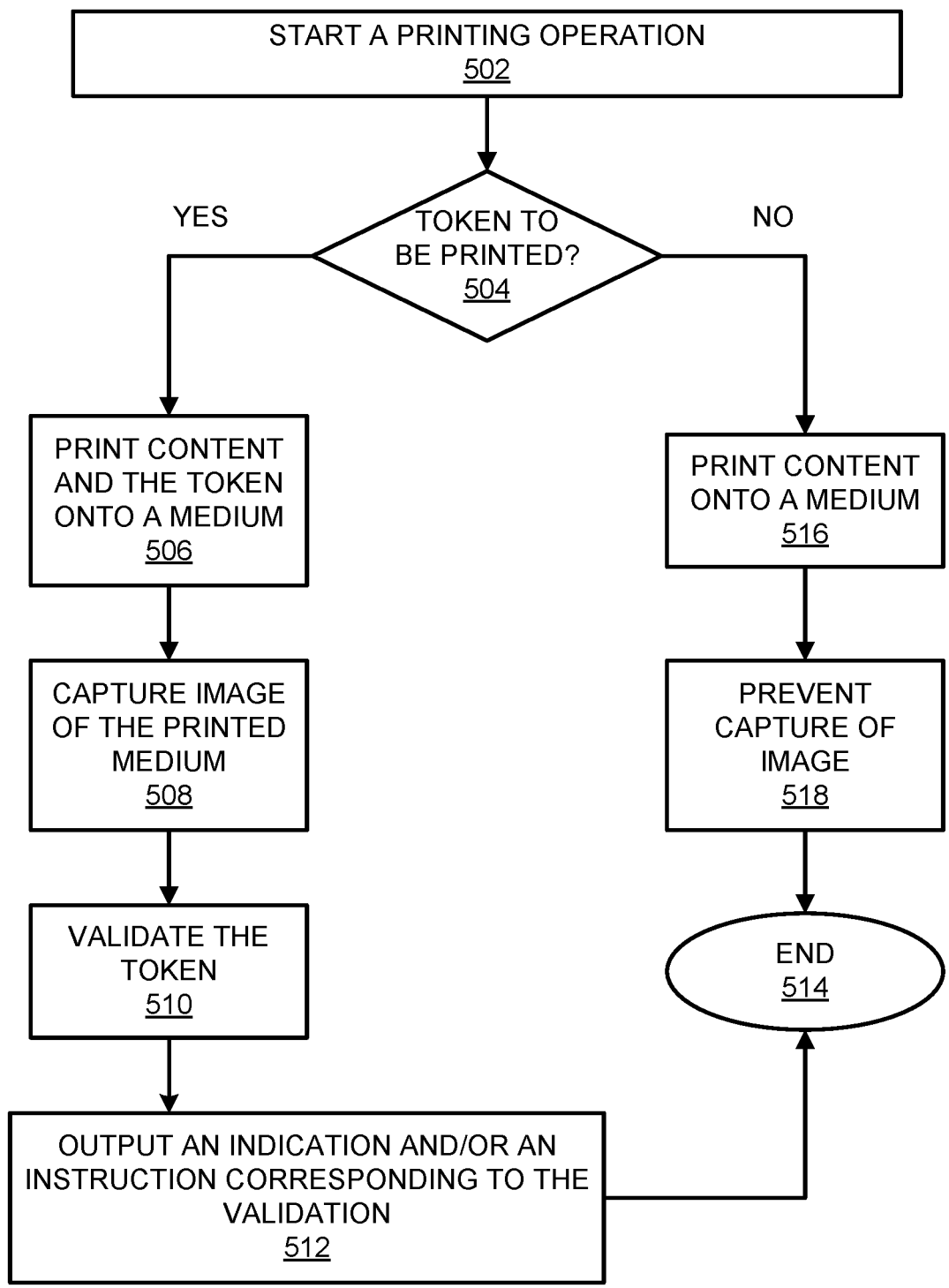

Various manners in which the processor 102 may be implemented are discussed in greater detail with respect to the methods 400 and 500 depicted in FIGS. 4 and 5. Particularly, FIGS. 4 and 5, respectively, depict example methods 400, 500 for validating a token 202 printed onto a printed medium 204 based on a captured image 214 of the token 202. It should be apparent to those of ordinary skill in the art that the methods 400, 500 may represent generalized illustrations and that other operations may be added or existing operations may be removed, modified, or rearranged without departing from scopes of the methods 400, 500.

The descriptions of the methods 400, 500 are made with reference to the apparatus 100, the printing system 200, and the printing system 300 illustrated in FIGS. 1-3 for purposes of illustration. It should be understood that apparatuses and/or printing systems having other configurations may be implemented to perform the methods 400 and/or 500 without departing from scopes of the methods 400, 500.

At block 402, the processor 102 may control a print mechanism 220 to print content 206 and a token 202 onto a medium 204. The print mechanism 220 may apply a printing material onto the medium 204 to print the content 206 and the token 202 as discussed herein. At block 404, the processor 102 may control a scan bar 210 to capture an image 214 of the printed content 206 and the printed token 202 on the printed medium 204. As shown in FIGS. 2 and 3, the scan bar 210 may be positioned along a media feed path 212 from the printing mechanism 220. The scan bar 210 may also capture multiple images of the printed content 206 and the printed token 202 on the printed medium 204 as the printed medium 204 is fed past the scan bar 210. The processor 102 or another processor may stitch the multiple captured images together to form a combined image of the printed token 202. The processor 102 or another processor may, in some examples, similarly stitch the multiple captured images together to form a combined image of the printed content 206.

At block 406, the processor 102 may determine whether the printed medium 204 includes a valid copy of the token 202. The processor 202 may determine whether the token 202 printed on the printed medium 204 is valid in any of the manners discussed above. For instance, the processor 202 may make the determination or may send a copy of the printed token 202 and/or printed medium 204 to a computing device 310, which may make the determination.

At block 408, the processor 102 may output an indication and/or an instruction corresponding to the token 202 being invalidly printed onto the printed medium 204 based on a determination that the printed medium 204 does not include a valid copy of the token 202. The processor 102 may output the indication to alert a user of the invalid token 202 and/or may output an instruction to a printing mechanism 220 to properly print the token 202 in a future printed medium 204.

Turning now to FIG. 5, at block 502, the processor 102 may start a printing operation. That is, for instance, the processor 102 may receive an instruction to print a document to print a raster image included in a data file. At block 504, the processor 102 may determine whether the raster image includes a token to be printed with content to be printed onto a medium. Based on a determination that a token is to be printed, at block 506, the processor 102 may cause the printing mechanism 220 to print the content 206 and the token 202 onto a medium to create a printed medium 204. In addition, at block 508, the processor 202 may control a scan bar 210 to capture an image 214 of the printed medium 508, for instance, as the printed medium 204 is fed past the scan bar 210 along a media feed path 212.

At block 510, the processor 102 may validate the token 202 printed onto the printed medium 204. The processor 102 may validate the token 202 itself or the computing device 310 may validate the token 202 as discussed herein. In addition, at block 512, the processor 102 may output an indication and/or an instruction corresponding to the validation. That is, for instance, based on a determination that the token 202 is valid, the processor 102 may output an indication that the token 202 is valid. In some examples, the processor 102 may not output an indication in instances in which the token 202 is determined to be valid. In addition, based on a determination that the token 202 is invalid, the processor 102 may output an indication that the token 202 is invalid and/or may output an instruction to modify a setting in the printing mechanism 220 to cause the token to be printed properly in another medium. As indicated at block 514, the method 500 may end following block 512.

Based on a determination that a token is not to be printed, at block 516, the processor 102 may print the content 206 onto the medium 204. In addition, at block 518, the processor 102 may prevent capture of an image of the printed medium 204. That is, for instance, the processor 102 may deactivate or maintain the scan bar 210 in an inactive state while the printed medium 204 is fed past the scan bar 210. In other examples in which the printing system 300 includes multiple media feed paths 212, 302, the processor 102 may cause the printed medium 204 to be fed along a second media feed path 302 to which the scan bar 210 may not have access. The method 500 may end following block 518 as indicated at block 514.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
   a processor; and
   a non-transitory computer readable medium on which is stored instructions that when executed by the processor, are to cause the processor to:
      determine whether a token is to be printed onto a medium;
      based on a determination that the token is to be printed onto the medium, following printing onto the medium in a printing system, cause a scan bar in a media feed path of the printing system to capture an image of the printed medium;
      determine, from the captured image of the printed medium, whether the token was properly printed onto the printed medium;
      based on a determination that the token was not properly printed onto the printed medium, output an indication and/or an instruction corresponding to the token being improperly printed; and
      based on a determination that the token is not to be printed onto the medium, prevent the scan bar from capturing the image of the printed medium.

2. The apparatus of claim 1, wherein the instructions to prevent the scan bar from capturing the image of the printed medium are further to cause the processor to:
   maintain the scan bar in an inactive state as the printed medium is fed in the media feed path past the scan bar.

3. The apparatus of claim 1, wherein the printing system comprises a second media feed path, wherein the scan bar does not access the second media feed path, and wherein the instructions to prevent the scan bar from capturing the image of the printed medium are further to cause the processor to:
   cause the printed medium to be fed through the second media feed path.

4. The apparatus of claim 1, wherein the instructions are further to cause the processor to:
   access a raster image to be printed onto the medium; and
   determine whether the token is to be printed onto the medium from the accessed raster image to be printed onto the medium.

5. The apparatus of claim 1, wherein the instructions are further to cause the processor to:
   send a copy of the captured image of the printed medium, a copy of the token in the captured image, or both, to a computing device that is remote from the apparatus, wherein the computing device is to determine whether the token was properly printed onto the printed medium from the captured image of the printed medium, the copy of the token, or both, and to return an indication as to whether the token was properly printed onto the printed medium to the apparatus; and
   wherein the processor is to determine whether the token was properly printed onto the printed medium based on the indication returned from the computing device.

6. The apparatus of claim 5, wherein the instructions are further to cause the processor to:
   determine whether a validation of the token is to occur at the apparatus or at the computing device;
   send the copy of the captured image of the printed medium, a copy of the token in the captured image, or both, to the computing device based on a determination that the validation of the token is to occur at the computing device; and
   perform the validation of the token based on a determination that the validation of the token is to occur at the apparatus.

7. The apparatus of claim 1, wherein the token includes or represents meta-data, and wherein the instructions are further to cause the processor to:
   determine whether the token was properly printed onto the printed medium based on whether the token was printed accurately and/or whether the meta-data included in or represented in the token is accurately readable.

8. The apparatus of claim 1, wherein, to output an indication and/or an instruction corresponding to the token being improperly printed, the instructions are further to cause the processor to:
   output a visual indication on a display that the token was improperly printed;
   prevent a finishing operation from being performed on the printed medium;
   prevent a subsequent medium on which the token is to be printed from being printed;
   output an alert that the printing system is need of fixing and/or calibration; and/or
   modify a setting on the printing system to self-correct the printing of the token.

9. A printing system comprising:
   a print mechanism to output a printed medium along a media feed path;
   a scan bar positioned along the media feed path; and
   a processor to:
      determine whether a token is printed onto a medium;
      cause the scan bar to capture an image of the printed medium based on a determination that the token is printed onto the medium;
      validate, from the captured image of the printed medium, the token;
      based on a determination that the token is invalid, output an indication and/or an instruction corresponding to the token being invalid; and
      based on a determination that the token is not printed onto the medium, prevent the scan bar from capturing the image of the printed medium.

10. The printing system of claim 9, wherein, to prevent the scan bar from capturing the image of the printed medium, the processor is further to:
    maintain the scan bar in an inactive state as the printed medium is fed in the media feed path past the scan bar; or
    cause the printed medium to be fed through a second media feed path, wherein the scan bar does not access the second media feed path.

11. The printing system of claim 9, wherein the processor is further to access a raster image to be printed onto the medium and determine whether the token is printed onto the medium from the accessed raster image to be printed onto the medium.

12. The printing system of claim 9, wherein the processor is further to:
   determine whether validation of the token is to occur at the processor or at a computing device remote from the processor;
   based on a determination that the validation of the token is to occur at the computing device, send a copy of the captured image of the printed medium, a copy of the token in the captured image, or both, to the computing device and validate the token based on an indication returned from the computing device; and
   based on a determination that the validation of the token is to occur at the processor, perform the validation of the token.

13. A method comprising:
   controlling, by a processor, a print mechanism to print content and a token onto a medium;
   determining, by the processor, whether the token is to be printed onto the medium;
   based on a determination that the token is to be printed onto the medium, controlling, by the processor, a scan bar to capture an image of the printed content and the printed token on the printed medium;
   determining, by the processor, whether the printed medium includes a valid copy of the token;
   outputting, by the processor, an indication and/or an instruction corresponding to the token being invalidly printed onto the printed medium based on a determination that the printed medium does not include a valid copy of the token; and
   based on a determination that the token is not to be printed onto the medium, prevent the scan bar from capturing the image of the printed content and the token on the printed medium.

14. The method of claim 13, further comprising:
   sending a copy of the captured image of the printed content and the printed token or a copy of the printed token in the captured image to a computing device remote from the processor, wherein the computing device is to return an indication as to whether the token was properly printed onto the printed medium to the processor,
   wherein the determining of whether the printed medium includes a valid copy of the token further comprises determining whether the printed medium includes a valid copy of the token based on the indication received from the computing device.

15. The method of claim 13, wherein the preventing of the scan bar from capturing the image of the printed content and the token on the printed medium comprises:
   maintaining the scan bar in an inactive state as the printed medium is fed in a media feed path past the scan bar; or
   causing the printed medium to be fed through a second media feed path, wherein the scan bar does not access the second media feed path.

16. The apparatus of claim 1, wherein the token includes at least one of a barcode, a quick-reference code, a particular pattern, or a watermark.

* * * * *